(12) United States Patent
Wagner et al.

(10) Patent No.: US 9,643,515 B2
(45) Date of Patent: May 9, 2017

(54) METHOD AND APPARATUS FOR OPERATING A BATTERY ARRANGEMENT OF A MOTOR VEHICLE

(71) Applicant: Robert Bosch GmbH, Stuttgart (DE)

(72) Inventors: Andreas Wagner, Stuttgart (DE); Vincent Schulte-Coerne, Beilstein (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/386,433

(22) PCT Filed: Jan. 24, 2013

(86) PCT No.: PCT/EP2013/051358
§ 371 (c)(1),
(2) Date: Sep. 19, 2014

(87) PCT Pub. No.: WO2013/139506
PCT Pub. Date: Sep. 26, 2013

(65) Prior Publication Data
US 2015/0100188 A1    Apr. 9, 2015

(30) Foreign Application Priority Data
Mar. 20, 2012    (DE) .................. 10 2012 204 410

(51) Int. Cl.
*B60L 9/00*    (2006.01)
*B60L 11/00*    (2006.01)
(Continued)

(52) U.S. Cl.
CPC ......... *B60L 11/1874* (2013.01); *B60L 11/187* (2013.01); *B60L 11/1851* (2013.01);
(Continued)

(58) Field of Classification Search
CPC ......... G06F 7/00; B60L 11/18; B60L 11/1874
(Continued)

(56) References Cited

U.S. PATENT DOCUMENTS

2008/0213652 A1    9/2008    Scheucher
2010/0324765 A1*   12/2010   Iida et al. .................. 701/22
(Continued)

FOREIGN PATENT DOCUMENTS

DE    102005023365    11/2006
DE    102009046568    5/2011
(Continued)

OTHER PUBLICATIONS

International Search Report for Application No. PCT/EP2013/051358 dated May 24, 2013 (English Translation, 3 pages).

*Primary Examiner* — Jelani Smith
*Assistant Examiner* — Mahmoud Ismail
(74) *Attorney, Agent, or Firm* — Michael Best & Friedrich LLP (57) ABSTRACT

The invention relates to a method (40) for operating a battery arrangement (14) of a motor vehicle (10), in particular a traction battery of the motor vehicle (10), wherein expected environmental conditions and/or use parameters of the motor vehicle (10) are determined (42), wherein an expected withdrawal of energy from an electrical energy store of the battery arrangement (14) is determined (44), wherein a heat loss of the battery arrangement (14) is calculated (46) on the basis of the expected withdrawal of energy, wherein a temperature profile (30) of the battery arrangement (14) is predicted (48) on the basis of the calculated heat loss and the expected environmental conditions and/or use parameters, and wherein a temperature of the battery arrangement (14) is set (54) on the basis of the predicted temperature profile (30).

21 Claims, 3 Drawing Sheets

(51) Int. Cl.
   *G05D 1/00*     (2006.01)
   *G05D 3/00*     (2006.01)
   *G06F 7/00*     (2006.01)
   *G06F 17/00*    (2006.01)
   *B60L 11/18*    (2006.01)
   *H01M 10/48*    (2006.01)
   *H01M 10/625*   (2014.01)
   *H01M 10/615*   (2014.01)
   *H01M 10/633*   (2014.01)
   *H01M 10/613*   (2014.01)
   *H01M 10/6561*  (2014.01)

(52) U.S. Cl.
   CPC ....... *B60L 11/1861* (2013.01); *B60L 11/1875* (2013.01); *H01M 10/48* (2013.01); *H01M 10/613* (2015.04); *H01M 10/615* (2015.04); *H01M 10/625* (2015.04); *H01M 10/633* (2015.04); *B60L 11/18* (2013.01); *B60L 2240/545* (2013.01); *B60L 2240/64* (2013.01); *B60L 2260/54* (2013.01); *B60L 2260/56* (2013.01); *H01M 10/6561* (2015.04); *H01M 2220/20* (2013.01); *Y02T 10/705* (2013.01); *Y02T 10/7005* (2013.01); *Y02T 10/7291* (2013.01); *Y02T 90/16* (2013.01); *Y10S 903/903* (2013.01)

(58) Field of Classification Search
   USPC .......................................................... 701/22
   See application file for complete search history.

(56) References Cited

U.S. PATENT DOCUMENTS

2011/0016899 A1\* 1/2011 Ogura ................ B60H 1/00278
                                                              62/239
2012/0025762 A1 2/2012 Lienkamp et al.

FOREIGN PATENT DOCUMENTS

JP    2006139963   6/2006
WO    2012079983   6/2012

\* cited by examiner

METHOD AND APPARATUS FOR OPERATING A BATTERY ARRANGEMENT OF A MOTOR VEHICLE

BACKGROUND OF THE INVENTION

The invention relates to a method for operating a battery arrangement of a motor vehicle, in particular a fraction battery of the motor vehicle.

Moreover, the present invention relates to an apparatus for operating a battery arrangement of a motor vehicle, in particular a traction battery of the motor vehicle, wherein the apparatus can be electrically coupled to a heating/cooling arrangement for heating or cooling the battery arrangement.

An electric cell or rather a battery is an electrochemical energy storage device and an energy converter. In the case of charging the battery, stored chemical energy is converted into electrical energy by means of an electrochemical reaction. The electrical energy can be used by a consumer that is electrically coupled to the battery. In principle, a differentiation is made in the case of batteries between primary batteries and secondary batteries. Primary batteries can only be charged once and not recharged. In contrast, secondary batteries can be recharged. The term 'battery' is used hereinunder as a synonym for the secondary battery or rather the secondary cell.

A battery is used in motor vehicles for the purpose inter alia of providing electric current for the headlamps, the on-board electronics and for the starter for starting the combustion engine. In the case of electric or hybrid vehicles, the battery is also used as an energy storage device for the electric drive of motor vehicles. Said battery consequently has a significant role in determining the performance and range of the vehicle. For this reason, it is essential that the state of the battery in the case of electrically driven vehicles is constantly monitored in order for the driver to be aware of the useable energy store.

A battery management system (BMS) is used for the purpose of monitoring and controlling the re-chargeable battery and said battery management system is used in an additional interface between the vehicle and the electronic components that are installed in the battery. The battery management system assumes various functions, such as for example cell protection, charge monitoring, load management, determining a charge state and thermal management for the purpose of setting an optimal operating temperature.

Traction batteries (for example lithium ion battery) that are usually used in electrically driven vehicles have in general the characteristic that they function efficiently only within a limited temperature range. Below this temperature range, the current losses greatly increase and the maximum output is no longer available. If the battery is operated outside the temperature range, this can lead to an accelerated aging of the battery and even to the battery becoming damaged. In the case of known methods, the temperature of the battery is therefore set in such a manner that during the operation of the motor vehicle the battery is always operating within the limited temperature range. Methods are also known whereby the temperature of the battery is only held within the optimal temperature range if the motor vehicle is connected to an external energy source. In this case, the energy consumption that results from heating or cooling of the battery has a negative effect on the range of the motor vehicle. Furthermore, it is possible in the case of a motor vehicle that is shut down (also without an external energy supply) to check regularly whether an upper temperature threshold of the temperature range is exceeded. If this is the case, the battery is accordingly cooled for the purpose of protecting components. In the case of very low temperatures, the battery is usually not checked regularly and possibly overheats. In fact, the battery is heated to a higher temperature as required, for example during a planned journey. However, the described procedures of cooling or respectively heating the battery require a high output of energy. In the case of an electrically driven vehicle during the driving operation or respectively in the case of a motor vehicle that is shut down without being connected to an external energy supply, the achievable range of an electrically driven vehicle is consequently considerably reduced. Even if the motor vehicle is connected to an external energy supply, the cooling and heating procedures result in an overall increased current consumption by the electric vehicle and as a result poor energy efficiency.

SUMMARY OF THE INVENTION

The present invention therefore provides a method for operating a battery arrangement of a motor vehicle, in particular a traction battery of the motor vehicle, wherein anticipated environmental conditions and/or operating parameters of the motor vehicle are determined, an anticipated energy withdrawal from an electric energy storage device of the battery arrangement is determined, heat loss from the battery arrangement is calculated on the basis of the anticipated energy withdrawal, a temperature progression of the battery arrangement is predicted on the basis of the calculated heat loss and the anticipated environmental conditions and/or operating parameters, and a temperature is set for the battery arrangement on the basis of the predicted temperature progression.

Moreover, the present invention provides a device for operating a battery arrangement of a motor vehicle, in particular a traction battery of the motor vehicle, wherein the device can be electrically coupled to a heating/cooling arrangement for the purpose of artificially heating or cooling the battery arrangement, and wherein the device is designed so as to perform the method of the above-mentioned type.

In the case of the present invention, the lost energy from the vehicle operation and the temperature of the vehicle environment are used in addition for heating or cooling the battery arrangement. As a result, it is possible to reduce the operation of the heating and cooling arrangement to a minimum. For this purpose, the temperature progression of the battery is predicted with the aid of a temperature model of the battery and taking into consideration of the anticipated environmental conditions and/or operating parameters (route data, temperature forecasts). The present invention renders it possible to set the temperature of the battery arrangement in advance on the basis of the predicted temperature progression. The range of the motor vehicle is optimized as a result of the reduced energy consumption for cooling/heating the battery arrangement during the driving operation. In general, the energy consumption is reduced by virtue of the battery arrangement being heated and cooled in an optimized manner in accordance with the invention. Consequently, the energy efficiency of the motor vehicle is significantly increased.

In a preferred embodiment, the battery arrangement is heated or cooled by means of a medium in particular ambient air that surrounds the motor vehicle.

In the case of the present invention, the ambient air is used as an additional energy source for heating or cooling the battery arrangement. As a consequence, the energy consumption for artificially heating or cooling the battery arrangement is reduced.

In accordance with a further embodiment, the temperature is set by virtue of artificially heating or cooling the battery arrangement.

It is ensured by virtue of this feature that the battery arrangement is not exposed to critical temperatures. Current losses thus remain below a predefined threshold. Excessively rapid ageing of the battery arrangement or damage to the battery arrangement is likewise prevented.

In a further embodiment, the temperature is set in such a manner that the temperature progression lies within a predefined first temperature range.

During the operation of the battery arrangement within the first temperature range, only very small current losses occur. Consequently, it is possible to operate the battery arrangement in an energy efficient manner. Moreover, it is prevented that the battery arrangement is damaged as a result of excessively temperatures.

In accordance with a further embodiment, a lower temperature threshold of the first temperature range is set in dependence upon the anticipated environmental conditions and/or operating parameters.

If the battery arrangement is operated at low temperatures, then only a reduced output can be made available. Moreover, the current losses are increased. In the case of known methods, the battery arrangement is therefore heated to a minimal temperature in order to be able to provide the full output immediately. However, this increases the energy consumption of the heating and cooling arrangement. For this reason, the lower temperature threshold of the first temperature range is set in accordance with the invention in dependence upon the anticipated environmental conditions and/or the operating parameters. By virtue of this feature, it is possible by way of example to reduce the lower temperature threshold if on the basis of the predicted route and temperatures it is expected that the power output will be far below a maximal value. As a consequence, the energy consumption for the heating procedure is reduced and the energy efficiency improved.

In accordance with a further embodiment, the temperature is set in such a manner that the temperature progression lies within a predefined second temperature range that extends the first temperature range.

In the case of this embodiment, the battery arrangement is heated or cooled if the temperature of the battery arrangement moves outside the second temperature range. If the battery arrangement comprises a temperature that lies outside the first temperature range and within the second temperature range, the battery arrangement is artificially heated or cooled only under defined conditions. This opens up further degrees of freedom when operating the heating/cooling arrangement and as a consequence leads to improved energy efficiency.

In a further preferred embodiment, the battery arrangement is heated or cooled if the battery arrangement is operated over a predefined period of time outside the first temperature range in order to set the temperature of the battery arrangement to a temperature within the first temperature range.

By virtue of this feature, a maximum time period is defined during which the battery arrangement may be operated outside the first temperature range. If this time period is exceeded, then the temperature of the battery arrangement is set by virtue of artificially heating or cooling to a temperature within the first temperature range. This prevents an excessive increase in the current losses or even damage to the battery arrangement. If the temperature of the battery arrangement automatically sets itself within the predefined time period back to a temperature within the first temperature range by means of using the ambient air for a heating or cooling procedure, then it is possible to forego an artificial heating or cooling procedure. Consequently, it is possible to reduce the energy consumption.

In accordance with a further preferred embodiment, the battery arrangement is heated or cooled if the battery arrangement is operated outside the first temperature range and the predicted temperature progression lies outside the first temperature range in order to set the temperature of the battery arrangement to a temperature within the first temperature range.

The battery arrangement is then only artificially heated or cooled by virtue of this measure if on the basis of the predicted temperature progression of the battery arrangement the temperature is not expected to be within the first temperature range. This in turn reduces the energy consumption of the heating/cooling system and consequently renders it possible to increase the range of the electrically driven motor vehicle.

In a further embodiment, the battery arrangement can be heated or cooled if on the basis of the predicted temperature progression the temperature is not expected to be within the first temperature range within the predefined time period. Consequently, the improved energy efficiency is combined with a protection against damage occurring to the battery arrangement that could occur if the battery arrangement is operated over an excessive period of time outside the first temperature range.

In accordance with a further embodiment, the anticipated energy withdrawal is determined on the basis of the anticipated environmental conditions and/or operating parameters.

By virtue of taking into consideration the future environmental conditions and/or operating parameters, it is possible to forecast in a more precise manner the temperature progression of the battery arrangement. As a consequence, it is possible in an improved manner to assess whether the battery arrangement is to be artificially heated or cooled, or whether the procedure of heating or cooling the battery arrangement by means of the ambient air is sufficient.

In a further embodiment, the temperature is set during a driving operation and/or while the motor vehicle is shut down.

As a consequence, the temperature of the battery arrangement is set in dependence upon a vehicle state. By way of example, it is possible for a planned journey to pre-set the temperature of the battery arrangement actually during the period of time in the motor vehicle is shut down.

In a further embodiment, the battery arrangement is pre-cooled or pre-heated during the shut-down period in the case of the motor vehicle being connected to an external electric energy source on the basis of the anticipated environmental conditions and/or operating parameters.

If by way of example a planned journey comprises great height differences in the route progression (i.e. a high energy withdrawal from the electric energy storage device of the battery arrangement is anticipated), then the battery arrangement is pre-cooled by means of the heating/cooling arrangement of the motor vehicle. Since the motor vehicle in the present case is connected to an external electric energy source, by way of example to an electric energy supply network, the range of the electrically driven vehicle is not negatively influenced by means of the cooling procedure.

Moreover, it is overall preferred if the temperature progression is predicted regularly at a predefined time interval.

By virtue of this feature, the predicted temperature progression is constantly updated. As a consequence, it is possible to take into consideration current predicted environmental conditions and/or operating parameters when further estimating the temperature. The more precise temperature progression of the battery arrangement that results from this leads to reduced energy consumption.

In accordance with a further embodiment, the environmental conditions and/or operating parameters comprise a height profile of a route to be traveled by the motor vehicle, an ambient temperature along the route to be traveled and/or an ambient temperature progression during the period of time when the motor vehicle is shut down.

It is rendered possible by taking into consideration the height profile to make an improved estimate of the anticipated energy withdrawal from the electric energy storage device of the battery arrangement. By way of example, a rapid increase in the height profile leads to a higher energy withdrawal and consequently to an increased temperature of the battery arrangement. Accordingly, it is possible to pre-cool the battery arrangement in preparation for the rapid increase. This applies in a similar manner for a predicted high ambient temperature along the route to be traveled. It is also possible to cool the battery arrangement in this situation in order to avoid any subsequent intensive cooling of the battery arrangement or even to avoid damage to the battery arrangement. By virtue of taking into consideration the ambient temperature progression during the period of time in which the motor vehicle is shut down, it is rendered possible to forego by way of example an artificial cooling if it is anticipated that sufficient cooling is provided by means of the ambient air during the period of time in which the motor vehicle is shut down.

Furthermore, the environmental conditions and/or operating parameters can comprise a driver profile of the motor vehicle. As a consequence, it is possible when predicting the temperature progression to take into consideration different driving styles. Thus, by way of example, in the case of a sport-like driving style, a higher energy withdrawal and consequently heating of the battery arrangement is anticipated than in the case of a defensive-like driving style. Consequently, the operation of the heating/cooling system can be optimized to the individual driving style of the respective driver.

In accordance with a further embodiment, the anticipated environmental conditions and/or operating parameters are determined with the aid of a route guidance system allocated to the motor vehicle and/or with the aid of a communication network.

With the aid of the route guidance system or rather communication system, it is possible to achieve a best possible forecast of the environmental conditions and/or operating parameters. This results in a more precise prediction of the temperature progression of the battery arrangement and consequently improved energy efficiency when operating the heating/cooling arrangement of the motor vehicle.

It goes without saying that the features, characteristics and advantages of the method in accordance with the invention can also relate to or rather be applied accordingly to the device in accordance with the invention.

Moreover, it goes without saying that the features that are mentioned above and are still to be explained hereinunder can be applied not only in the respective mentioned combination but rather also in other combinations or as stand-alone without departing from the scope of the invention.

DETAILED DESCRIPTION

Figure 1:
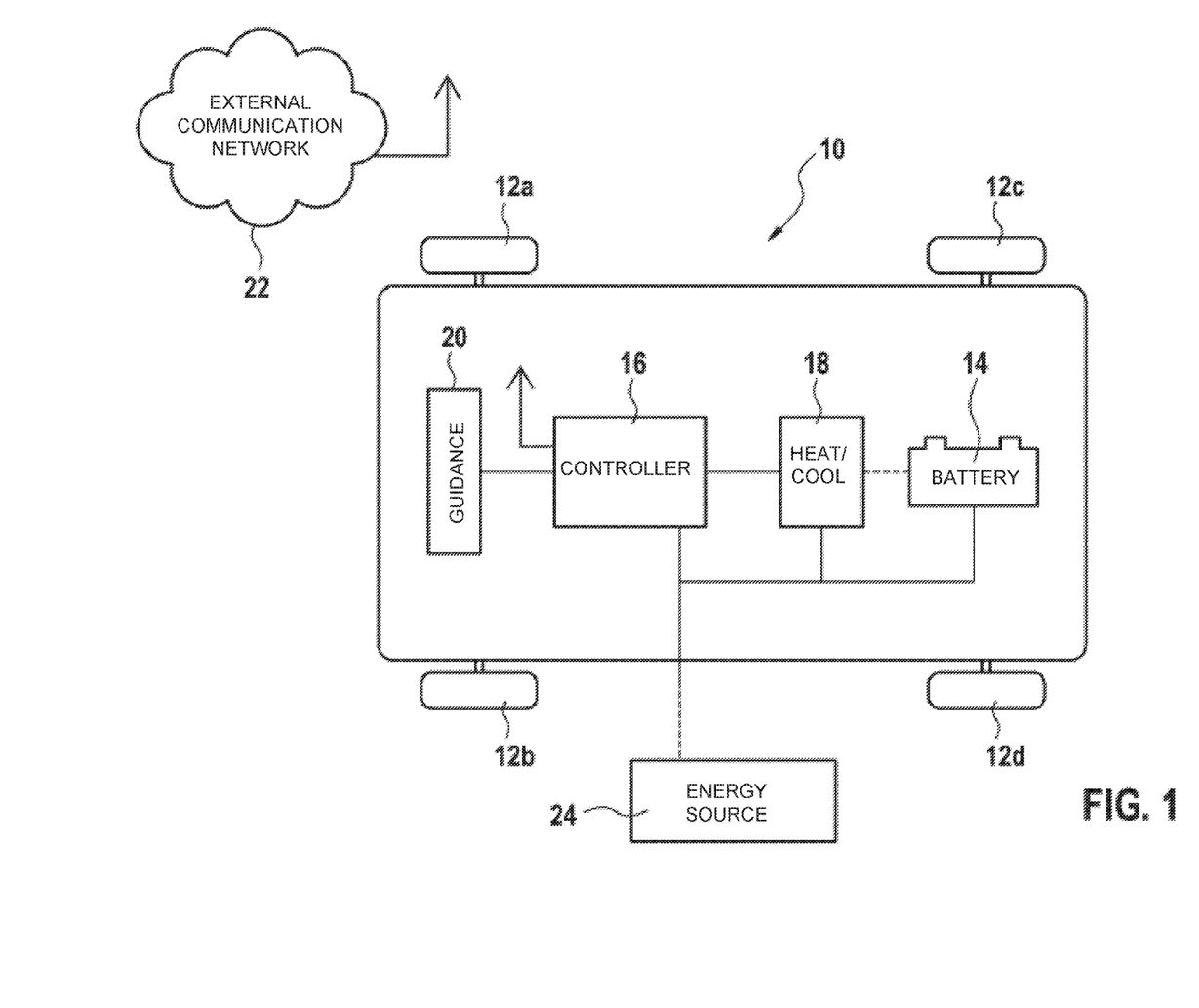
FIG. 1 illustrates in a schematic form a motor vehicle with a device in accordance with the invention for operating a battery arrangement.

FIG. 1 illustrates a schematic view of a motor vehicle that is denoted in general by the numeral 10. The motor vehicle 10 comprises an electric drive train for the purpose of providing the drive output and said drive train is not described in detail in FIG. 1. The electric drive train is used for the purpose of driving a defined number of wheels 12 of the motor vehicle 10.

In an alternative embodiment, the motor vehicle 10 can comprise a conventional drive train having a combustion engine or a hybrid drive train having a combustion motor and an electric machine.

The motor vehicle 10 comprises a battery arrangement 14 in the present example a traction battery 14 that is used as an electric energy storage device for the electric drive train of the motor vehicle 10. Moreover, the motor vehicle 10 comprises a device 16 in accordance with the invention for the purpose of operating the battery arrangement 14. The device 16 is electrically coupled to a heating/cooling arrangement 18 for the purpose of heating or cooling the battery arrangement 14 and said heating/cooling arrangement is in turn coupled thermally to the battery arrangement 14. Furthermore, the device 16 is electrically connected to a route guidance system 20 and by way of a radio connection to an external communication network 22. Moreover, the motor vehicle 10 can be connected to an external electric energy source 24, in the present case to an external electric energy supply network 24.

In order to reduce the energy consumption of the motor vehicle 10 (and consequently to increase the range), the energy lost from the vehicle operation and the energy from the environment of the motor vehicle 10, in particular the ambient air, are used in the present invention as further heating/cooling sources. As a consequence, it is possible to reduce the operation of the heating/cooling arrangement 18 to a minimum. In order to minimize the heating/cooling output for the battery arrangement 14 with respect to a simple control of the temperature within a range, it is necessary to know an anticipated temperature progression or rather the heat flowing into or rather out of the battery arrangement 14. It is necessary for this purpose to take into consideration anticipated environmental conditions and/or operating parameters. For this purpose, the device 16 determines by means of the route guidance system 20 a route profile of a route that is to be traveled by the motor vehicle 10. Moreover, the device 16 determines with the aid of the communication network 22 an ambient temperature along the route that is to be traveled by the motor vehicle 10. Furthermore, the device 16 with the aid of the communication network 22 can also determine a temperature development in the target range for the anticipated shut-down time period. This is achieved by way of example by way of contacting a weather forecast service within the communication network 22. In dependence upon these defined environmental conditions and/or operating parameters and using a temperature model of the battery arrangement 14, the device 16 predicts the temperature progression of the battery arrangement 14. With the aid of the predicted temperature progression, the device 16 can control the heating/cooling arrangement 18 in an energy efficient manner. The battery arrangement 14 is only artificially heated or cooled by means of the heating/cooling arrangement 18 if the temperature of the battery arrangement 14 cannot be held within a pre-defined range as a result of the energy lost from the vehicle operation and the energy from the environment of the motor vehicle 10.

Even in the case of the motor vehicle 10 being connected to the energy supply network 24, the device 16 determines with the aid of the anticipated environmental conditions and/or operating parameters and the predicted temperature progression of the battery arrangement 14 an energy-optimal control of the heating/cooling arrangement 18. If, by way of example by means of the weather forecast service, a very high ambient temperature is predicted for the planned journey on the next day, then the battery arrangement 14 can be pre-cooled by means of the heating/cooling arrangement 18 during the period of time in which the motor vehicle 10 is shut down. Since the motor vehicle 10 is connected to the energy supply network 24, the required energy consumption does not have a negative effect on the range of the motor vehicle 10. On the contrary, it is possible by way of example to forego the cooling of the battery arrangement 14 if the weather forecast service predicts very low ambient temperatures. Consequently, it is not necessary to draw any energy from the energy supply network 24. The energy efficiency of the motor vehicle 10 is thus increased.

Figure 2:
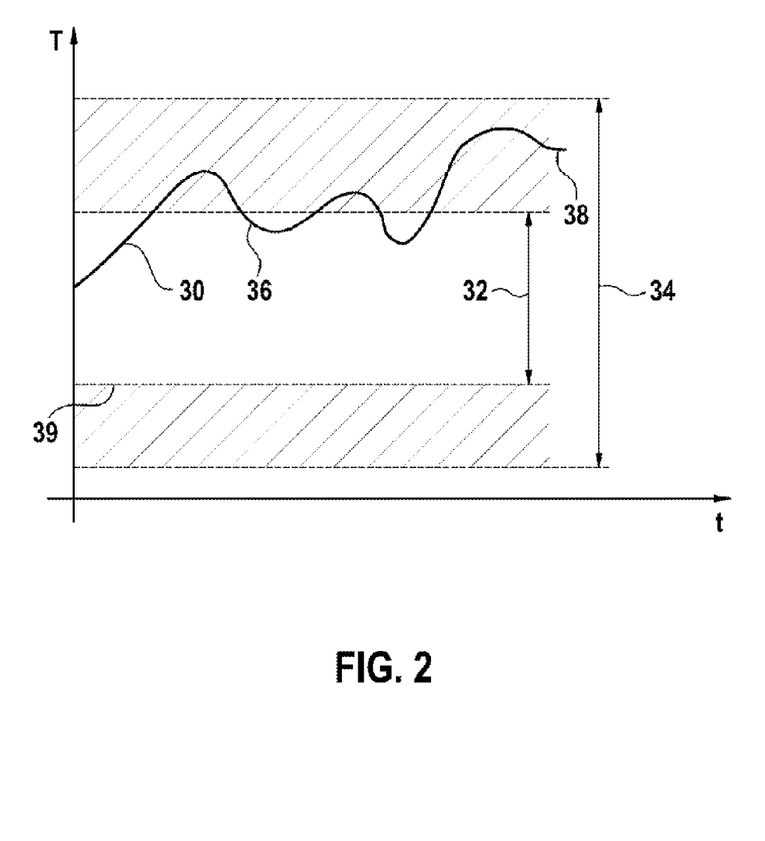
FIG. 2 illustrates a diagram of a predicted temperature progression of the battery arrangement.

FIG. 2 illustrates a temperature progression 30 as predicted by means of the device 16 for the battery arrangement 14. The time is plotted on the x-axis and the anticipated temperature of the battery arrangement 14 is plotted on the y-axis. As is evident in FIG. 2, a first temperature range 32 and a second temperature range 34 that extends the first temperature range 32 is defined. It is possible within the first temperature range 32 to operate the battery arrangement 14 with small current losses. A rapid ageing and accordingly damage to the battery arrangement 14 is likewise prevented. The second temperature range 34 is dimensioned in such a manner that the battery arrangement 14 can continue to be operated with possibly somewhat higher current losses and whilst maintaining defined conditions. Thus, the battery arrangement 14 is heated or cooled if the battery arrangement 14 is operated over a pre-defined period of time outside the first temperature range 32. Furthermore, the battery arrangement 14 is artificially heated or cooled by means of the heating/cooling arrangement 18 if the battery arrangement 14 is operated outside the first temperature range and moreover if the predicted temperature progression 30 does not indicate that the temperature of the battery arrangement 14 will re-enter the first temperature range 32. In the present embodiment, these two conditions are combined with one another. Thus, the battery arrangement 14 can be artificially heated or cooled if the predicted temperature progression 30 does not indicate a temperature within the first temperature range 32 within a pre-defined period of time. This condition is illustrated by way of example by means of the reference numerals 36 and 38 in FIG. 2. It is evident at the reference numeral 36 that the temperature of the battery arrangement 14 re-enters the first temperature range 32 within a defined time interval. It is thus possible to forego artificially cooling the battery arrangement 14 by means of the heating/cooling arrangement 18. The energy consumption of the motor vehicle 10 is consequently reduced. In the case of the reference numeral 38, the temperature is not expected to re-enter the first temperature range 32. It is therefore necessary to artificially cool the battery arrangement 14 by means of the heating/cooling arrangement 18 in order to prevent damage or rather rapid ageing of the battery arrangement 14. The battery arrangement 14 is likewise artificially heated or cooled if the temperature of the battery arrangement 14 moves outside the second temperature range 34. Furthermore, it is possible also to artificially heat or to cool the battery arrangement 14 if the predicted temperature progression 30 predicts a temperature outside the second temperature range 34. Consequently, the battery arrangement 14 can be pre-conditioned in order to avoid it being very intensively heated or cooled during the subsequent use and consequently to avoid a very high energy consumption.

If the battery arrangement 14 is operated in a lower temperature range, it is thus possible to provide only a reduced output. It is therefore necessary to limit the power output of the battery arrangement 14. In the case of known methods, the battery is therefore heated to by way of example at least 10° C. (depending upon the battery type) in order to provide the full power immediately. However, this leads to increased energy consumption. In accordance with the invention, the energy consumption of the heating/cooling arrangement 18 is reduced by virtue of the fact that a lower temperature threshold 39 of the first temperature range 32 is set in dependence upon the anticipated environmental conditions and/or operating parameters. If, by way of example as a result of the predicted route and environmental temperatures, it is expected that the power output will be far below a maximal value (for example an urban cycle requires only approx. 20% of the power that is required for a motorway cycle), then the lower temperature threshold 39 is reduced in such a manner that the power requirements are reliably fulfilled. It is consequently no longer necessary to heat the battery arrangement to 10° C. The energy-intensive heating operation is consequently avoided or at least reduced.

Figure 3:
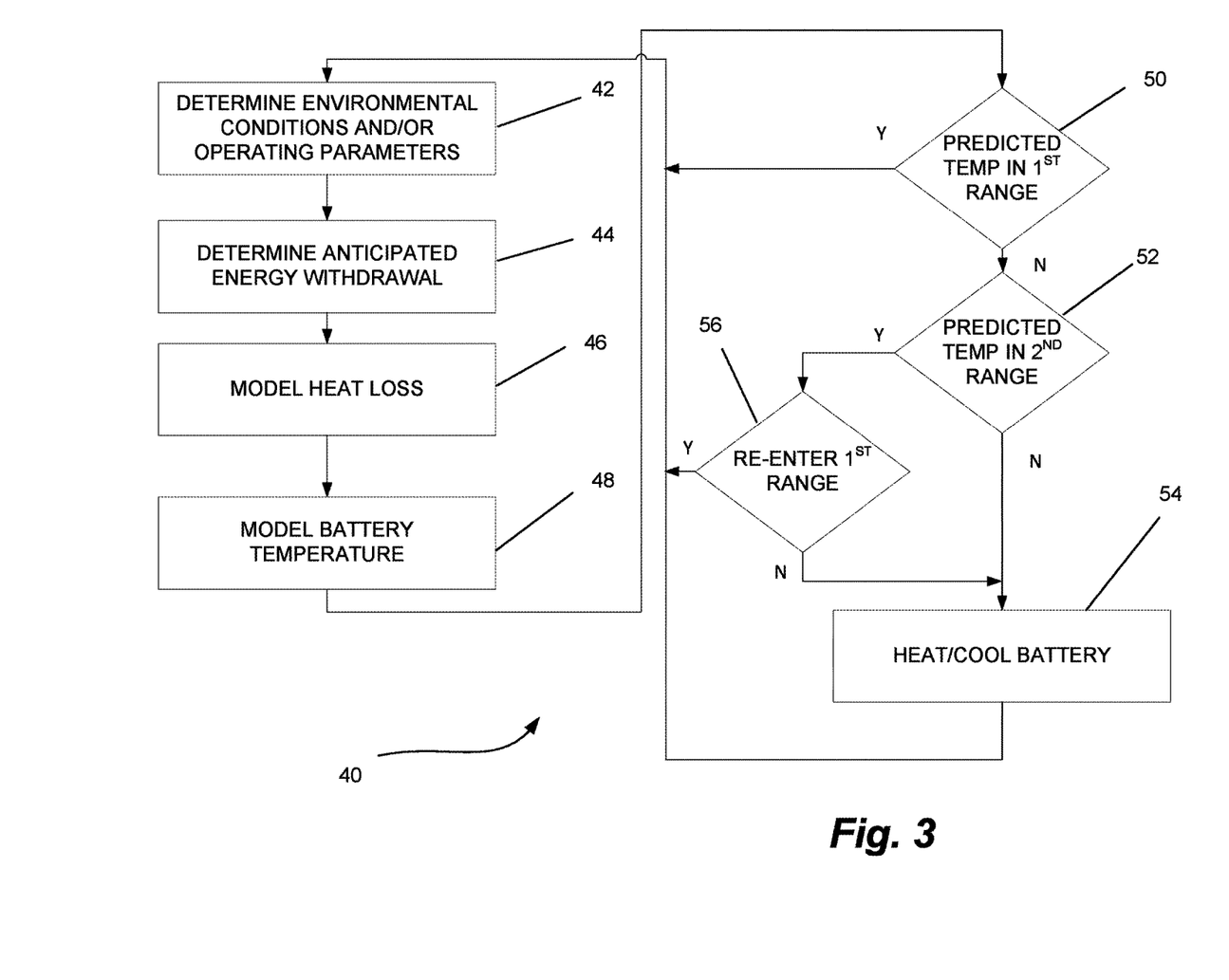
FIG. 3 illustrates a diagram for explaining an embodiment of a method in accordance with the invention.

FIG. 3 illustrates an embodiment of a method in accordance with the invention 40 for the purpose of operating the battery arrangement 14 of the motor vehicle 10.

For this purpose, the anticipated environmental conditions and/or operating parameters of the motor vehicle 10 are initially determined in a first step 42. The route or rather height profile of the route to be traveled by the vehicle 10 is determined by way of example with the aid of the route guidance system 20 or an off-board service within the communication network 22. Temperature data are likewise collected by way of a weather forecast service of the communication network 22 along the route that is to be traveled. Moreover, a driver profile is ascertained that defines by way of example whether the driving style is more sport-like or defensive-like.

On the basis of the defined environmental conditions and/or operating parameters, an anticipated energy withdrawal from an electric energy storage device of the battery arrangement 14 is determined in step 44. It is thus possible by way of example in the case of great height differences in the route profile and in the case of a sport-like driving style to expect a high energy withdrawal.

A heat loss in a cooling circuit of the battery arrangement 14 is modeled in step 46 in dependence upon the anticipated energy withdrawal.

In a further step 48, a temperature model of the battery arrangement 14 is used and said temperature model compares the transmission of heat between the battery arrangement 14 and the vehicle environment of the heat loss in the cooling circuit. Finally, the temperature progression 30 of the battery arrangement 14 is predicted with the aid of the said temperature model and the predicted environmental conditions and/or operating parameters. It is rendered possible by means of the predicted temperature progression 30 to control the heating/cooling arrangement 18 in an energy-optimized manner.

In a further step 50, a check is performed as to whether the predicted temperature progression 30 moves within the first temperature range 32. If this is the case, it is possible to forego a procedure of artificially heating or cooling the battery arrangement 14. The procedure of regularly determining the predicted temperature progression 30 is then continued with step 42.

If the predicted temperature progression 30 is not moving within the first temperature range 32, then a check is performed in step 52 as to whether the current temperature of the battery arrangement 14 and the predicted temperature progression 30 are moving within the second temperature range 34.

If the current temperature or the predicted temperature progression 30 lie outside the second temperature range 34, then the battery arrangement 14 is artificially heated or cooled in step 54 by means of the heating/cooling arrangement 18 in order to set the battery arrangement 14 to a temperature within the first temperature range 32.

If it is established in step 52 that the current temperature of the battery arrangement 14 or respectively the predicted temperature progression 30 lies within the second temperature range 34, then a check is performed in step 56 regarding the length of the period of time the battery arrangement 14 is being operated outside the first temperature range 32. Furthermore, a check is performed as to whether the predicted temperature progression 30 is indicating a re-entry of the temperature of the battery arrangement 14 into the first temperature range 32. If a re-entry into the first temperature range 32 within a pre-defined period of time is indicated, then it is possible to forego a procedure of artificially heating or cooling the battery arrangement 14 by means of the heating/cooling arrangement 18. The procedure of regularly determining the predicted temperature progression 30 is continued with the step 42. If, however, on the basis of the predicted temperature progression 30 no temperature is to be expected within the first temperature range 32, then it is necessary to artificially heat or cool the battery arrangement 14 in step 54 in order to prevent damage to the battery arrangement 14.

Following the step 54, the procedure of regularly determining the predicted temperature progression 30 is continued with the aid of step 42.

It is possible with the aid of the method in accordance with the invention 40 to operate the heating/cooling arrangement 18 in an energy efficient manner. By way of example, it is possible to forego a procedure of actively cooling the battery arrangement 14 if it is concluded from the route progression that the loss of heat will considerably reduce in comparison to the transmission of heat to the vehicle environment (for example imminent change from the motorway to a country road). In a similar manner, a heating operation is not required if because of an imminent incline in the route profile a steep increase in heat loss is to be expected. It is also possible with the aid of the predicted temperature progression 30 to achieve optimizations with respect to energy consumption even for a motor vehicle 10 that is shut down. Thus, for example, it is not necessary to cool the battery arrangement 14 if the journey is about to terminate and the ambient temperature in the target range current or in the future progression lies below the operating temperature and thus contributes to the cooling of the battery arrangement 14. This naturally only applies as long as the temperature of the battery arrangement 14 in the remaining route does not increase to critical values outside the second temperature range 34. However, it is possible to check this condition in advance with the aid of the predicted temperature progression 30.

If the motor vehicle 10 is connected to the external electric energy source 24, it is thus possible to pre-cool the battery arrangement 14 by way of example to a low temperature within the second temperature range 34 if a high ambient temperature and consequently intense heating by means of the environment is expected for the next journey. As a consequence, it is possible to increase the range of the motor vehicle 10 for the next journey since the energy required for the cooling procedure is drawn from the external electric energy source 24 and not from the battery arrangement 14. This procedure of pre-cooling the battery arrangement 14 can in turn also be optimized with respect to energy by way of the anticipated environment temperature progression. For this purpose, it is possible by way of example to take into consideration temperature minima during the period of time in which the motor vehicle 10 is shut down in order to use the ambient air of the motor vehicle 10 to the best possible extent for cooling the battery arrangement 14. The energy withdrawal from the external electric energy source 24 is consequently minimized.

Consequently, the energy consumption of the motor vehicle 10 during the driving operation and during the period of time in which the motor vehicle 10 is shut down is minimized by virtue of the present invention.

Although preferred embodiments of the method in accordance with the invention and the device in accordance with the invention are illustrated, it goes without saying that different variations and modifications can be performed.

By way of example, the temperature progression 30 can only be determined during a driving operation of the motor vehicle 10.

Furthermore, the battery arrangement 14 can only be heated or cooled if the temperature is not predicted to be within the first temperature range 32. The period of time in which the battery arrangement 14 is operated outside the first temperature range 32 is not taken into consideration in this exemplary embodiment.

The invention claimed is:

1. A method (40) for operating a battery arrangement (14) of a motor vehicle (10), having the steps of:
    determining (42), by a device (16), anticipated environmental conditions and/or operating parameters of the motor vehicle (10),
    determining (44), by the device (16), an anticipated energy withdrawal from an electric energy storage device of the battery arrangement (14),
    calculating (46), by the device (16), heat loss from the battery arrangement (14) on the basis of the anticipated energy withdrawal,
    predicting (48), by the device (16), a temperature progression (30) of the battery arrangement (14) on the basis of the calculated heat loss and the anticipated environmental conditions and/or operating parameters, and
    setting (54), by the device (16), a temperature for the battery arrangement (14) on the basis of the predicted temperature progression (30);

wherein, when the predicted temperature progression (30) lies within a pre-defined first temperature range (32) the battery arrangement (14) is not heated or cooled, when the predicted temperature progression (30) lies within a pre-defined second temperature range (34) that extends the pre-defined first temperature range (32) for less than a pre-defined period of time, the battery arrangement (14) is not heated or cooled, when the predicted temperature progression (30) lies outside the pre-defined second temperature range (34) the battery arrangement (14) is heated or cooled, and when the predicted temperature progression (30) lies within the pre-defined second temperature range (34) for more than the pre-defined period of time, the battery arrangement (14) is heated or cooled.

2. The method (40) for operating a battery arrangement (14) of a motor vehicle (10) as claimed in claim 1, wherein the battery arrangement (14) is heated or cooled by a medium that is surrounding the motor vehicle (10).

3. The method (40) for operating a battery arrangement (14) of a motor vehicle (10) as claimed in claim 1, wherein the temperature is set by artificially heating or cooling the battery arrangement (14).

4. The method (40) for operating a battery arrangement (14) of a motor vehicle (10) as claimed in claim 1, wherein a lower temperature threshold (39) of the pre-defined first temperature range (32) is set based upon the anticipated environmental conditions and/or operating parameters.

5. The method (40) for operating a battery arrangement (14) of a motor vehicle (10) as claimed in claim 1, wherein the battery arrangement (14) is heated or cooled if the battery arrangement (14) is operated for a pre-defined period of time outside the pre-defined first temperature range (32) in order to set the temperature of the battery arrangement (14) to a temperature within the pre-defined first temperature range (32).

6. The method (40) for operating a battery arrangement (14) of a motor vehicle (10) as claimed in claim 1, wherein the battery arrangement (14) is heated or cooled if the battery arrangement (14) is operated outside the pre-defined first temperature range (32) and the predicted temperature progression (30) lies outside the pre-defined first temperature range (32) in order to set the temperature of the battery arrangement (14) to a temperature within the first temperature range (32).

7. The method (40) for operating a battery arrangement (14) of a motor vehicle (10) as claimed in any claim 1, wherein the anticipated energy withdrawal is determined on the basis of the anticipated environmental conditions and/or operating conditions.

8. The method (40) for operating a battery arrangement (14) of a motor vehicle (10) as claimed in any claim 1, wherein the temperature is set during a driving operation and/or during a period of time in which the motor vehicle (10) is shut down.

9. The method (40) for operating a battery arrangement (14) of a motor vehicle (10) as claimed in claim 8, wherein the battery arrangement (14) is pre-cooled or pre-heated during the shut-down period in the case of the motor vehicle (10) being connected to an external electric energy source (24) on the basis of the anticipated environmental conditions and/or operating parameters.

10. The method (40) for operating a battery arrangement (14) of a motor vehicle (10) as claimed in claim 1, wherein the temperature progression (30) is predicted regularly at a pre-defined time interval.

11. The method (40) for operating a battery arrangement (14) of a motor vehicle (10) as claimed in claim 1, wherein the anticipated environmental conditions and/or operating parameters comprise at least one of the following features:
a route profile of a route to be traveled by the motor vehicle (10),
an ambient temperature along the route to be traveled,
an ambient temperature progression during the period of time in which the motor vehicle (10) is shut down.

12. The method (40) for operating a battery arrangement (14) of a motor vehicle (10) as claimed in claim 1, wherein the anticipated environment conditions and/or operating parameters are determined using a route guidance system (20) that is allocated to the motor vehicle (10) and/or using a communication network (22).

13. A device (16) for operating a battery arrangement (14) of a motor vehicle (10), wherein the device (16) can be electrically coupled to a heating/cooling arrangement (18) for the purpose of heating or cooling the battery arrangement (14), and wherein the device (16) is designed so as to perform the method (40) for operating a battery arrangement (14) of a motor vehicle (10) as claimed in claim 1.

14. The method (40) for operating a battery arrangement (14) of a motor vehicle (10) as claimed in claim 1, wherein the battery arrangement (14) includes a traction battery.

15. The method (40) for operating a battery arrangement (14) of a motor vehicle (10) as claimed in claim 2, wherein the medium is ambient air that is surrounding the motor vehicle (10).

16. The method (40) for operating a battery arrangement (14) of a motor vehicle (10) as claimed in any claim 1, wherein the temperature is set during a period of time in which the motor vehicle (10) is shut down.

17. The method (40) for operating a battery arrangement (14) of a motor vehicle (10) as claimed in claim 1, wherein the temperature is set during a driving operation of the motor vehicle (10).

18. The method (40) for operating a battery arrangement (14) of a motor vehicle (10) as claimed in claim 1, wherein the battery arrangement (14) is heated or cooled if the temperature of the battery arrangement (14) moves outside the predefined second temperature range.

19. The method (40) for operating a battery arrangement (14) of a motor vehicle (10) as claimed in claim 1, wherein the battery arrangement (14) is heated or cooled if the temperature of the battery arrangement (14) is outside the predefined first temperature range (32) and is within the predefined second temperature range, and if no temperature of the temperature progression (30) of the battery arrangement (14) is expected to fall within the predefined first temperature range.

20. A method (40) for operating a battery arrangement (14) of a motor vehicle (10), having the steps of:
determining (42), by a device (16), anticipated environmental conditions and/or operating parameters of the motor vehicle (10),
determining (44), by the device (16), an anticipated energy withdrawal from an electric energy storage device of the battery arrangement (14),
calculating (46), by the device (16), heat loss from the battery arrangement (14) on the basis of the anticipated energy withdrawal,
predicting (48), by the device (16), a temperature progression (30) of the battery arrangement (14) on the basis of the calculated heat loss and the anticipated environmental conditions and/or operating parameters, and setting (54), by the device (16), a temperature for the battery arrangement (14) on the basis of the predicted temperature progression (30);

wherein, when the predicted temperature progression (30) lies within a pre-defined first temperature range (32) the battery arrangement (14) is not heated or cooled, when the predicted temperature progression (30) lies within a pre-defined second temperature range (34) that extends the pre-defined first temperature range (32) for less than a pre-defined period of time, the battery arrangement (14) is not heated or cooled, when the predicted temperature progression (30) lies outside the pre-defined second temperature range (34) the battery arrangement (14) is heated or cooled, and when the predicted temperature progression (30) lies within the pre-defined second temperature range (34) for more than the pre-defined period of time, the battery arrangement (14) is heated or cooled;

wherein the temperature is set in such a manner that the temperature progression (30) lies within the pre-defined first temperature range (32); and wherein a lower temperature threshold (39) of the pre-defined first temperature range (32) is set based upon the anticipated environmental conditions and/or operating parameters including an expected power output.

21. A method (40) for operating a battery arrangement (14) of a motor vehicle (10), having the steps of:

determining (42), by a device (16), anticipated environmental conditions and/or operating parameters of the motor vehicle (10), determining (44), by the device (16), an anticipated energy withdrawal from an electric energy storage device of the battery arrangement (14), calculating (46), by the device (16), heat loss from the battery arrangement (14) on the basis of the anticipated energy withdrawal, predicting (48), by the device (16), a temperature progression (30) of the battery arrangement (14) on the basis of the calculated heat loss and the anticipated environmental conditions and/or operating parameters, and setting (54), by the device (16), a temperature for the battery arrangement (14) on the basis of the predicted temperature progression (30);

wherein, when the predicted temperature progression (30) lies within a pre-defined first temperature range (32) the battery arrangement (14) is not heated or cooled, when the predicted temperature progression (30) lies within a pre-defined second temperature range (34) that extends the pre-defined first temperature range (32) for less than a pre-defined period of time, the battery arrangement (14) is not heated or cooled, when the predicted temperature progression (30) lies outside the pre-defined second temperature range (34) the battery arrangement (14) is heated or cooled, and when the predicted temperature progression (30) lies within the pre-defined second temperature range (34) for more than the pre-defined period of time, the battery arrangement (14) is heated or cooled, wherein the temperature is set during a driving operation and/or during a period of time in which the motor vehicle (10) is shut down, wherein the battery arrangement (14) is pre-cooled or pre-heated during the shut-down period in the case of the motor vehicle (10) being connected to an external electric energy source (24) on the basis of the anticipated environmental conditions and/or operating parameters.

* * * * *